United States Patent
Laverne et al.

(10) Patent No.: US 12,320,653 B2
(45) Date of Patent: *Jun. 3, 2025

(54) SYSTEMS AND METHODS FOR MULTI-MODAL TRANSFER CAPABILITIES FOR SMART INFRASTRUCTURE

(71) Applicant: Volkswagen Group of America Investments, LLC, Reston, VA (US)

(72) Inventors: Michel Laverne, Pittsburgh, PA (US); Ilan Biala, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,303

(22) Filed: Jun. 6, 2023

(65) Prior Publication Data
US 2023/0324185 A1 Oct. 12, 2023

Related U.S. Application Data

(63) Continuation of application No. 17/073,119, filed on Oct. 16, 2020, now Pat. No. 11,709,061.

(51) Int. Cl.
*G01C 21/34* (2006.01)
*G01C 21/00* (2006.01)
(Continued)

(52) U.S. Cl.
CPC ..... *G01C 21/3423* (2013.01); *G01C 21/3602* (2013.01); *G01C 21/3893* (2020.08); *H04W 4/44* (2018.02); *H04W 4/46* (2018.02)

(58) Field of Classification Search
CPC ............ G01C 21/3423; G01C 21/3602; G01C 21/3893; H04W 4/44; H04W 4/46; H04W 4/18
See application file for complete search history.

(56) References Cited

U.S. PATENT DOCUMENTS 9,802,638 B1 10/2017 Stoffel et al.
2005/0225457 A1* 10/2005 Kagawa ............... G08G 1/0965
340/995.13

(Continued)

FOREIGN PATENT DOCUMENTS

DE 102020208460 A1 * 1/2022
JP 2009075703 A * 4/2009
(Continued)

OTHER PUBLICATIONS

Machine Translation of JP2009075703A (Year: 2009).*
(Continued)

*Primary Examiner* — Sahar Motazedi
(74) *Attorney, Agent, or Firm* — Fox Rothschild LLP

(57) ABSTRACT

Systems, methods, and computer-readable media for receiving, by a smart infrastructure device and from a first vehicle, first information associated with the first vehicle in a first format associated with a first communication protocol. The first information is converted from the first format into an agnostic format. An image, video, or real-time feed of an environment of the smart infrastructure device is captured. The first vehicle and a second vehicle in the image, video, or real-time feed is identified. It is determined that the second vehicle is temporarily or permanently incapable of performing a communication with the smart infrastructure device based on the image, video, or real-time feed. The image, video, or real-time feed is analyzed to generate second information associated with the second vehicle. The second information is converted into the agnostic format.

20 Claims, 6 Drawing Sheets

(51) Int. Cl.
*G01C 21/36* (2006.01)
*H04W 4/44* (2018.01)
*H04W 4/46* (2018.01)

(56) References Cited

U.S. PATENT DOCUMENTS

| | | | |
|---|---|---|---|
| 2014/0129047 A1* | 5/2014 | Barrett | H04W 4/046 |
| | | | 701/1 |
| 2016/0274978 A1* | 9/2016 | Strohmenger | G05B 15/02 |
| 2017/0208439 A1* | 7/2017 | Hider | G01C 21/3661 |
| 2018/0159324 A1 | 6/2018 | Teggatz et al. | |
| 2019/0113913 A1 | 4/2019 | Ryne et al. | |
| 2019/0339082 A1* | 11/2019 | Doig | G01C 21/3848 |
| 2019/0378414 A1* | 12/2019 | Pari | G08G 1/04 |
| 2020/0234459 A1* | 7/2020 | Naikal | G01C 21/3867 |
| 2021/0176090 A1 | 6/2021 | Yamamoto et al. | |
| 2021/0274328 A1* | 9/2021 | Feng | H04L 51/214 |
| 2022/0020268 A1* | 1/2022 | Harris | G06Q 20/308 |

FOREIGN PATENT DOCUMENTS

| | | | | |
|---|---|---|---|---|
| JP | 2017182278 A | * | 10/2017 | |
| JP | 2018085133 A | * | 5/2018 | |
| WO | WO-2018146808 A1 | * | 8/2018 | B60Q 1/02 |
| WO | WO-2020250643 A1 | * | 12/2020 | |

OTHER PUBLICATIONS

Machine Translation of JP2017182278A (Year: 2017).*
Machine Translation of JP2018085133A (Year: 2018).*
Machine Translation of WO2018146808A1 (Year: 2018).*
Machine Translation of WO2020250643A1 (Year: 2020).*
Machine Translation of DE102020208460A1 (Year: 2022).*

* cited by examiner

SYSTEMS AND METHODS FOR MULTI-MODAL TRANSFER CAPABILITIES FOR SMART INFRASTRUCTURE

RELATED APPLICATIONS AND CLAIM OF PRIORITY

This application is a continuation of, and claims priority to, U.S. patent application Ser. No. 17/073,119 (now U.S. Pat. No. 11,709,061), filed Oct. 16, 2020, titled SYSTEMS AND METHODS FOR MULTI-MODAL TRANSFER CAPABILITIES FOR SMART INFRASTRUCTURE. The priority application is incorporated into this document by reference in its entirety

BACKGROUND

The current landscape for actors (for example, vehicles, pedestrian mobile devices, electric scooters, unmanned aerial vehicles (UAVs), and/or any other type of actors) operating in conjunction with smart infrastructure systems is and may remain fragmented because, among other reasons, the current smart infrastructure ecosystem may include actors of different generations. For example, vehicles in the ecosystem may vary in their associated technological capabilities, with some vehicles lacking any advanced driver-assistance systems (ADAS) capabilities (for example, a level zero vehicle in the Society of Automotive Engineers (SAE) six level autonomous vehicle classification system) and some vehicles including varying degrees of ADAS up to fully autonomous capabilities (for example, vehicles that have level four or greater autonomous capabilities). Especially when considering vehicle life cycles, it is likely that such technological disparity in the vehicular ecosystem may always exist to some extent. Even the most aggressive forecasts may only predict 50% market penetration for connected vehicles in early 2030. Similarly, consumer mobile devices, while displaying a faster adoption rate, still show a fairly wide spectrum of capabilities and features across the user base. The current market for smart infrastructure may not be aligned on a specific technology to support widespread adoption across manufacturers and vendors. This situation is likely to continue until government mandated regulations are put in place. Even then, different regulations may result in different technologies being deployed based on geographical locations. This impacts not only the radio and transmission protocols, but also the application layers as well.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
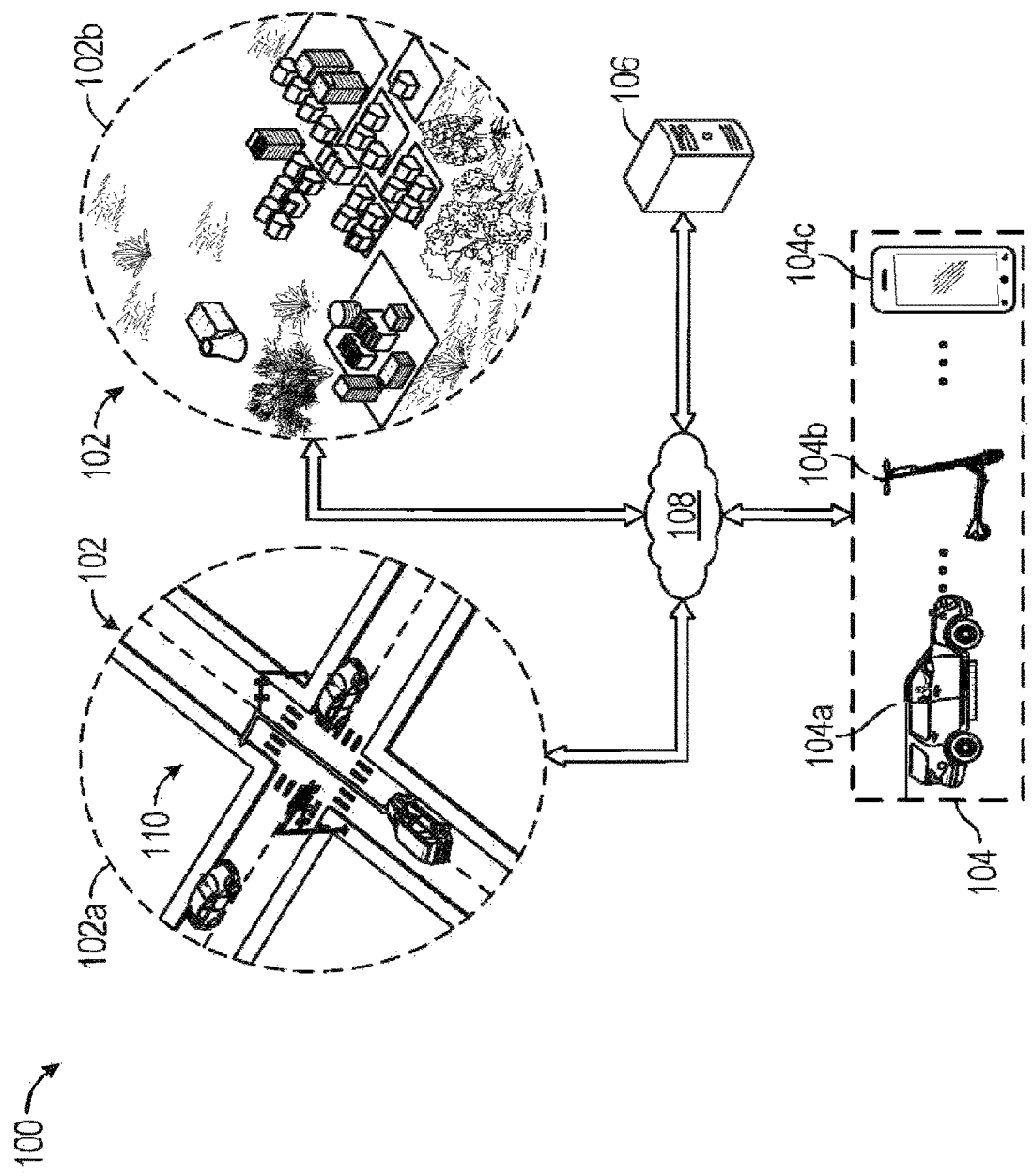
FIG. 1 depicts a schematic illustration of an example system, in accordance with one or more example embodiments of the disclosure.

This disclosure relates to, among other things, systems and methods for multi-modal transfer capabilities for smart infrastructure. More particularly, in some embodiments, the systems and methods described herein may involve the use of smart infrastructure to obtain and disseminate information to multiple different types of actors with varying degrees of connectivity that may be employ any number of different types of communication protocols, examples of which may be provided below. That is, the smart infrastructure may serve as an intermediary for translating and sharing information among various actors that may communicate using different communication protocols. The smart infrastructure may also serve to capture information about actors that are incapable of any communication at all and provide this information to the other actors as well. Smart infrastructure as described herein may refer to any infrastructure that is capable of communicating with devices that are located externally to the infrastructure. Smart infrastructure may describe devices that enable a more intelligent understanding of the physical world and better interactions with the underlying infrastructure. As one example, smart infrastructure may include devices associated with a road intersection, such as traffic cameras, traffic lights, road sensors (for example, sensors that may be used to detect the presence of cars on the road, a temperature of the road, etc.), and the like. As a second example, smart infrastructure may include devices associated with a highway or a highway on ramp. It should be noted that reference may be made herein to road-related types of infrastructure for consistency sake, however, any other type of infrastructure may also be applicable. For example, devices in a power grid, buildings located within a city, or any other infrastructure that is capable of being equipped with processing capabilities that allow communication with external devices. A smart infrastructure system as described herein may refer to a group of devices located within a geographical proximity of one another (for example, a group of devices located within an imaginary geographical boundary). Each device may itself be a smart infrastructure device. For example, a smart infrastructure system may include infrastructure located at a particular road intersection. Continuing this example, the smart infrastructure system at the intersection may include two traffic cameras and two traffic lights. Each of the two traffic cameras and two traffic lights may be smart infrastructure devices. In some cases, the devices included within a smart infrastructure system may form a local communication network or may otherwise be hardwired together to allow for local communications. The devices included within the smart infrastructure system may be configured to serve one or more common purposes, such as managing traffic at the road intersection. In some instances, the smart infrastructure devices that are classified as being included within a particular smart infrastructure system may depend on this common goal, rather than the geographical proximity of the smart infrastructure devices. For example, another smart infrastructure system may include devices associated with a power grid for providing power to residential homes. One smart infrastructure device may be located at a power plant, and several other smart infrastructure devices may be located in individual residential homes. The distance between such devices may be great in this particular example, but all of the smart infrastructure devices within this example power grid smart infrastructure system may serve the same purpose of ensuring that power is correctly provided to the residential homes.

In some embodiments, the road intersection smart infrastructure system and power grid smart infrastructure system may just two examples of types of smart infrastructure systems, and any number and/or combination of types of smart infrastructure systems may exist in an environment (for example, a city, a state, a region, or any other type of geographical area on either a smaller or larger scale). For example, one particular city may include a number of such smart infrastructure systems that may work together to ensure the functioning of the infrastructure systems found within the city. These multiple smart infrastructure systems may form a network of smart infrastructure systems that may be capable of communicating with one another (or with external devices not included within any smart infrastructure system) through permanent or temporary network connections as may be described below. In some instances, some or all of the smart infrastructure systems may be incapable of directly communicating with other smart infrastructure systems, and may require an intermediary to transmit data between such smart infrastructure systems. For example, a traffic light at an intersection in a rural town may not have the connectivity required to interact with other infrastructure remotely located from the traffic light.

In some embodiments, the term actor as may be used herein may refer to any element that may exist in an environment with the smart infrastructure. For example, an actor may include a vehicle, a non-vehicle device such as a mobile device of a pedestrian, an electric scooter, an unmanned aerial vehicle (UAV), and/or any other element that may exist in an environment around a smart infrastructure system. Some or all of the actors may be capable of communicating with other actors and/or with smart infrastructure. Such communications may be based on any number of communication protocols that may exist. These communication protocols may include network transmission protocols, such as for example, 3G, Long Term Evolution (LTE), LTE-Advanced, 5G, IEEE 802.11, IEEE 802.16, Bluetooth, ZigBee, near-field communication (NFC), and the like. The communication protocols may also include any other number of protocols as well, such as vehicle-to-infrastructure (V2I) communications, vehicle-to-vehicle (V2V) communications, vehicle-to-everything (V2X) communications and the like. For example, some vehicles may perform V2V communications based on the Society of Automotive Engineers (SAE) J2735 standard and some vehicles may perform V2V communications based on the ITS-G5 communication standard (among various other types of communication standards for various types of communications). The communication protocols may also include any other protocols by which actors may perform communications. Additionally, some or all of the actors may also be incapable of any communication with other actors and/or with smart infrastructure. For example, some vehicles may not include the technology to allow them to communicate with other actors and/or with smart infrastructure in this regard (such vehicles may be referred to as "legacy vehicles" herein), such as vehicles included within the level zero categorization of the Society of Automotive Engineers (SAE) six level autonomous vehicle classification system some embodiments, the road intersection smart infrastructure system and power grid smart infrastructure system may just two examples of types of smart infrastructure systems, and any number and/or combination of types of smart infrastructure systems may exist in an environment (for example, a city, a state, a region, or any other type of geographical area on either a smaller or larger scale). For example, one particular city may include a number of such smart infrastructure systems that may work together to ensure the functioning of the infrastructure systems found within the city. These multiple smart infrastructure systems may form a network of smart infrastructure systems that may be capable of communicating with one another (or with external devices not included within any smart infrastructure system) through permanent or temporary network connections as may be described below. In some instances, some or all of the smart infrastructure systems may be incapable of directly communicating with other smart infrastructure systems, and may require an intermediary to transmit data between such smart infrastructure systems. For example, a traffic light at an intersection in a rural town may not have the connectivity required to interact with other infrastructure remotely located from the traffic light.

In some embodiments, and as described above, the existence of different types of actors with varying degrees of communication capabilities, as well as the existence of varying protocols that may be used by actors that do have such communication capabilities, may cause difficulties in information sharing between the different actors. As a first example, if a first vehicle is a fully autonomous vehicle that may rely on information about other vehicles (and other types of actors) in the environment to determine how to traverse the environment, and a second vehicle is also a vehicle that is capable of communicating information to other actors in the environment, then the first vehicle may obtain information from the second vehicle, and the first vehicle may then use this information to more effectively navigate the environment. However, if the second vehicle does not have the capability to communicate such information to other actors in the environment, then the first vehicle may operate with less information about actors in the environment (or may have to capture information about the second vehicle using its own sensors), which may increase the difficulty of navigating the environment for the first vehicle. Even if the second vehicle is capable of communicating information to the first vehicle, the second vehicle may also be configured to communicate information using a different communication protocol than the first vehicle, which may also lead to a difficulty or inability of the first vehicle to process information received from the second vehicle. As a second example, a first pedestrian may have a mobile device, such as a smartphone, that may be configured to provide information to the first vehicle (for example, the location, velocity, and heading of the first pedestrian). However, a second pedestrian may not have such a mobile device on their person, or may have a mobile device that may not be configured to provide such information to the first vehicle (or another actor in the environment). Similar examples may also be applicable to any other number and/or types of actors that may exist in the environment.

The systems and methods described herein may serve to mitigate or eliminate these problems that may arise in an ecosystem that includes numerous different types of actors with varying degrees of communication capabilities and that may use any number of different types of communication protocols. In some embodiments, this may be accomplished by using smart infrastructure as an intermediary between the various actors. The smart infrastructure may serve as an intermediary between the various actors in a number of different capacities. As one example, the smart infrastructure may be configured to receive information from actors in the environment through any number of communication protocols, translate the information into an agnostic format, store the information into the agnostic format, and then translate the information in the agnostic format into a non-agnostic communication protocol to provide to an actor in the environment depending on the communication protocol used by that particular actor. As a second example, the smart infrastructure may not necessarily need to translate the information into the agnostic format, but may rather may simply serve as a translation intermediary to translate information between different types of communication protocols to facilitate information sharing between actors that use different types of communication protocols. As a third example, the smart infrastructure may further be configured to capture information about actors in the environment that are not configured to communicate with other actors (and/or with the smart infrastructure), so that information about these actors may also be provided to the other actors in the environment.

In some embodiments, a first manner in which the smart infrastructure may serve as an intermediary between the various actors may include maintaining information received from the various actors in an agnostic data format. The smart infrastructure may receive information from various actors in various protocol-specific formats depending on the communication protocol used by a specific actor. The smart infrastructure may then translate or convert this data into the agnostic data format. In some embodiments, this translation or conversion of the information in the protocol-specific format into the agnostic format (as well as the translation or conversion from the agnostic format to a protocol-specific format as may be described below) may be performed using one or more lookup tables. In some embodiments, the translation or conversion may also be performed using any other suitable method, such as any geometric transformation to add data to an agnostic 3D coordinate system as described below. The lookup tables may include a listing of different types of standards that may be used by different actors to communicate information. Upon receipt of information from an actor, a smart infrastructure device may be able to reference a lookup table including information about the format used, which may allow the smart infrastructure device to extract information from the communication from the actor to include in the agnostic format. In some instances, the one or more lookup tables may be stored at the smart infrastructure devices themselves, or may be stored at one or more remote locations, such as one or more remote servers. The one or more lookup tables may also be stored in any other manner (for example, in any similar manner as the agnostic format data may be described below as being stored as well).

In some embodiments, the agnostic format data maintained at the smart infrastructure may refer to a representation of data and/or a protocol for communicating data that is independent of any specific protocol used by any of the various actors. As one non-limiting example, the agnostic format may be in the form of a 3D coordinate system representation of the environment based on information received from the actors in the environment. Continuing this example, the smart infrastructure may receive information about a heading, velocity, and current location of a first vehicle in a first format associated with a given communication protocol (as well as any other types of information about the first vehicle). The smart infrastructure may also receive information from any other number of actors in the environment as well. The smart infrastructure may convert this information in the first format associated with the communication protocol into the agnostic format and store the information. More particularly, the smart infrastructure may add a representation of the first vehicle in the 3D coordinate system, where the location of the representation within the 3D coordinate system may be based on the information provided by the vehicle. In some instances, the representation may be in the form of one or more points on the 3D coordinate system. In such instances, the one or more points may be associated with any of the information about the first vehicle, such as its speed, for example. The smart infrastructure system may also receive information about a pedestrian based on information received from a mobile device of the pedestrian. The smart infrastructure system may similarly convert this information into the agnostic format and store the information. More particularly, the smart infrastructure may add a representation of the pedestrian in the 3D coordinate system, where the location of the representation in the 3D coordinate system may be based on the information provided by the mobile device of the pedestrian. Thus, the agnostic 3D coordinate system stored at the smart infrastructure may now include information about the first vehicle and the pedestrian. Additionally, the information described above as being provided by the first vehicle and the pedestrian may simply be for exemplification purposes, and any other types of information may similarly be provided. Furthermore, although the data in the agnostic format is described above as being stored at the smart infrastructure, the data in the agnostic format may similarly be stored remotely from the smart infrastructure, and the smart infrastructure may access the remotely-stored data to provide to actors, as may be described below.

In some embodiments, the agnostic format data may be stored in any number of locations. As one example, the data may be stored locally to any of the smart infrastructure devices included within a smart infrastructure system. In this example, the agnostic format data may be stored at one particular smart infrastructure device, and other smart infrastructure devices may access the data stored at that one particular smart infrastructure device. Continuing this example, actors in the environment may request data from the particular smart infrastructure device that is storing the agnostic format data. Actors may also request information from other smart infrastructure devices, those devices may request the data from the device that is actually storing the data, the device that is actually storing the data may then provide the data to the smart infrastructure device that received the request, and the data may then be provided to the actors. This scenario may arise, for example, when one particular smart infrastructure device is more proximate to an actor requesting the data than the smart infrastructure device storing the agnostic format data, or if the smart infrastructure device storing the agnostic format data is outside of a communication range of the actor requesting the data. The information may also be provided to actors without a request from the actors for the data. For example, the smart infrastructure may determine that certain types of data may be provided to certain actors, or may also simply provide all information received to all actors in an unfiltered manner. This data may be provided to the actors by the smart infrastructure device storing the data, or the smart infrastructure device storing the data may transmit certain portions (or all) of the data to another smart infrastructure device to provide to the actors. As second example of storage locations for the agnostic format data, the data may be stored at multiple of the smart infrastructure devices. Continuing this example, the data may stored using a distributed ledger such that multiple smart infrastructure devices may simultaneously have access to the same agnostic format data. As a third example of storage locations for the agnostic format data, the data may instead be stored at a remote location from the smart infrastructure devices, such as one or more remote severs, rather than being stored locally to one or more of the smart infrastructure devices. Additionally, the manner in which data from various actors may be consolidated to create the agnostic format data may vary as well. For example, one smart infrastructure device may be designated as the device for receiving data from some or all of the actors, and the actors may initially provide all of the protocol-specific data to this particular smart infrastructure device. However, in other cases, the protocol-specific data may also be provided by actors to any number of different smart infrastructure devices, and then the smart infrastructure devices may coordinate to consulate any data that is received into the agnostic format. For example, the smart infrastructure devices may need to coordinate to ensure that all of the data is captured within the 3D coordinate representation (in the example situation where this is the agnostic format that is used).

In some embodiments, a second manner in which the smart infrastructure may serve as an intermediary between the various actors may include by serving to translate communications between various actors using different communication protocols without needing to store the data in an agnostic format. That is, the information may not need to be stored at the smart infrastructure devices or at a remote location before it is provided to other actors in the environment. For example, the smart infrastructure may receive information from a first actor that is formatted for a first protocol, translate the information into a format suitable for a second protocol that may be recognizable by a second actor, and then may transmit the information in the second protocol to the second actor. This translation may be performed in a similar manner in which translations are performed from information in the protocol-specific format into the agnostic format (as well as the translation or conversion from the agnostic format to a protocol-specific format). For example, the translations may be performed using one or more lookup tables, as well as any other suitable methods.

In some embodiments, as mentioned above, in addition to translating information received from actors in various formats, the smart infrastructure may also be capable of capturing information about actors in the environment that may not be capable of communicating with the smart infrastructure (or communicating with any other actors in the environment). Legacy actors, such as vehicles, pedestrian mobile devices, and any other types of actors, that are not equipped with such communication capabilities, may exist in the environment and may not be capable of communicating information to other actors in the environment because they may not possess the necessary technology to do so. For example, vehicles included within the level zero categorization of the Society of Automotive Engineers (SAE) six level autonomous vehicle classification system may not be able to communicate information to the smart infrastructure or to other actors. As a second example, pedestrians with mobile devices without internet connectivity capabilities may also not be able to provide information to smart infrastructure or other actors in the environment. Additionally, in some situations certain actors may be configured to communicate with smart infrastructure or other actors in the environment, but may temporarily be unable to do so (for example, due to a failure of a communication device associated with the actor). However, information regarding these legacy actors (as well as other actors that may be temporarily incapable of performing communications for any number of reasons) may be important to other actors in the environment as well. In order to ensure that such information is provided to the other actors in the environment, the smart infrastructure itself may capture the information about the legacy actors, and may either add this information to the agnostic format, or may simply provide the information to one or more of the other actors. In some instances, the smart infrastructure may capture information about the legacy actors by capturing one or more images, videos, and/or real-time feeds of the legacy actors in the environment. Based on the one or one or more images, videos, and/or real-time feeds of the legacy actors in the environment, the smart infrastructure may be able to determine information about the actors in the environment. For example, based on the one or more images, videos, and/or real-time feeds of the legacy actors, the smart infrastructure may be able to determine information about the actor, such as an object classification of the actor (for example, the type of actor), a location, velocity, and/or heading of the actor, as well as any other information about the actor that may be relevant.

In some embodiments, before capturing information about a particular actor, the smart infrastructure may determine whether the particular actor is a legacy actor that is incapable of communicating with the smart infrastructure (or other actors). This determination, for example, may be made by comparing information received by various actors that are capable of communicating with other actors and/or smart infrastructure to the actors present in the one or more images, videos, and/or real-time feeds captured by the smart infrastructure. For example, the smart infrastructure may receive information from a first vehicle and a second vehicle that are both capable of communicating with the smart infrastructure. The information received from the first vehicle and the second vehicle may indicate that the first vehicle is at a first location at a first time and the second vehicle is at a second location at the first time. The smart infrastructure system may determine that the one or more images, videos, and/or real-time feeds captured by the smart infrastructure include a vehicle in the first location at the first time and a vehicle at the second location at the first time, so the smart infrastructure may be able to determine that these are the first vehicle and the second vehicle. However, the smart infrastructure may also identify a third vehicle in the one or more images, videos, and/or real-time feeds. If the smart infrastructure is not able to associate any information received from any actors in the environment with the third vehicle in the one or more images, videos, and/or real-time feeds of the, then the smart infrastructure may determine that the third vehicle is incapable of communicating with the smart infrastructure. In such cases, the smart infrastructure may then ascertain information about the third vehicle to store in the agnostic format or to provide to the other actors through the one or more images, videos, and/or real-time feeds of the as described above. In some instances, the third vehicle may actually be capable of communicating with the smart infrastructure, but simply may not have provided any information to the smart infrastructure yet. In such instances, in order to verify whether the third vehicle is capable of communicating with the smart infrastructure, the smart infrastructure may transmit a request to the third vehicle. If the smart infrastructure received an acknowledgement or any other form of a response from the third vehicle, then it may be determined that the third vehicle is not a legacy vehicle. However, if no response is received from the third vehicle after a threshold period of time (or a threshold number of requests are sent), then the smart infrastructure may be able to confirm that the third vehicle is a legacy vehicle. This may serve as a secondary verification to ensure that the smart infrastructure reduces inefficiencies by only capturing information through the one or more images, videos, and/or real-time feeds for vehicles that are incapable of providing information to the smart infrastructure.

Illustrative Systems

Turning to the figures, FIG. 1 illustrates an example system 100, in accordance with one or more embodiments of this disclosure. The system 100 may illustrative a more generalized depiction of example smart infrastructure as may be described herein. In some embodiments, the system 100 may include one or more smart infrastructure system 102a (for example, smart infrastructure system 102, smart infrastructure system 102b, or any number of smart infrastructure systems). The system 100 may also include one or more actors 104 (for example, actor 104a, actor 104b, actor 104c, or any number of actors) and a management device 106. In some instances, any of the smart infrastructure systems 102, actors 104, and/or the management device 106 may communicate over a communications network 108.

In some embodiments, the communications network 108 may include any one or a combination of multiple different types of networks, such as cable networks, the Internet, wireless networks, and other private and/or public networks. In some instances, the communications network 108 may include cellular, Wi-Fi, or Wi-Fi direct. In some embodiments, the network may involve communications between vehicles in the network and/or between vehicles in the network and elements external to the network. For example, Vehicle-to-Vehicle (V2V), Vehicle-to-Infrastructure (V2I), Vehicle-to-Everything (V2X), and/or Dedicated Short Range Communications (DSRC), to name a few, may be used. The communications network 108 may also be a peer-to-peer network. A peer-to-peer network may be a network of interconnected "nodes" that are capable of transferring data directly between one another rather than sending and receiving data to other nodes using a centralized device, such as a server, as an intermediary. With respect to the smart infrastructure systems described herein, the nodes may include individual devices within any of the smart infrastructure systems existing on the network. In some cases, the nodes may also include the smart infrastructure systems as a whole, or even groups of multiple smart infrastructure systems. The nodes may also include entities beyond the smart infrastructure systems. For example, the nodes may include any other entity that may be used to send and/or receive data to and from any devices in a smart infrastructure system. As described above, some examples of such entities may include autonomous or non-autonomous vehicles, electric scooters, mobile devices, such as smart phones, etc. In some instances, the peer-to-peer networks may also be ad-hoc networks. An ad-hoc network may be a temporary network that may be established to allow data transfer to take place directly between two nodes as described above. The ad-hoc network may thus be formed to allow the peer-to-peer data transfers to take place and once the data transfer takes place, may be ended. Thus, the communications network 108 may be temporary in some cases and permanent in other cases. The communications network 108 may also simultaneously include both temporary and permanent connections as well. For example, a connection between the management device 106 and smart infrastructure systems 102 may be a permanent network connection and a connection between the actors 104 and the smart infrastructure systems may be temporary. These however, are merely examples, and any of the network connections between any elements described in this system 100 may either be temporary and/or permanent.

In some embodiments, the smart infrastructure systems 102 may refer to any infrastructure that is capable of communicating with components that are located externally to the infrastructure. Smart infrastructure may describe devices that enable a more intelligent understanding of the physical world and better interactions with the underlying infrastructure. A single smart infrastructure system 102 may comprise one or more smart infrastructure devices included within a given geographical region. In some instances, the smart infrastructure devices that are included within the smart infrastructure system 102 may serve a common goal (for example, managing traffic at a road intersection, as described in the example smart infrastructure 102a). Smart infrastructure systems 102a and 102b depict two examples of such smart infrastructure systems 102. For example, smart infrastructure system 102a may depict smart infrastructure located at a road intersection 110. The example smart infrastructure system 102a may be used to manage traffic at the road intersection 110. To this end, the smart infrastructure system 102a may include several smart infrastructure devices used to assist in managing the traffic at the road intersection 110. For example, such smart infrastructure devices may include a first traffic light, a second traffic light, a third traffic light, and a fourth traffic light. That is, the smart infrastructure system 102a as a whole may comprise a grouping of smart infrastructure devices several traffic lights. The smart infrastructure system 102a and the devices included within the smart infrastructure system 102a may be defined by a geographical region, such as the road intersection 110 in this case. However, smart infrastructure systems 102 and the devices they include may be defined in any other number of ways. For example, a smart infrastructure system may include a group of smart infrastructure devices that serve a common purpose (for example, managing a traffic intersection). A second example smart infrastructure system 102b may include smart infrastructure devices used to assist in the distribution of power from a power plant to residential homes. For example, the smart infrastructure system 102b may include a management device at a power plant, one or more line-monitoring devices, and/or one or more residential home monitoring devices. These smart infrastructure systems 102a and 102b are merely examples of types of smart infrastructure systems 102 and any other type of smart infrastructure may be applicable as well.

In some embodiments, actors 104 (for example, actor 104a, actor 104b, actor 104c, or any number of actors) may include any entity that is generally capable of moving from one location to another (for example, traversing the geographical region in which a smart infrastructure system 102 is located). As depicted in the figure, actor 104a may be a vehicle, actor 104b may be an electric scooter, and actor 104c may be a mobile phone. To provide further examples, in the context of the example smart infrastructure system 102a, actors 104 may include vehicles, bikes, and/or mobile phones. However, these are merely examples of actors, and any other type of entity may be applicable, such as an unmanned aerial vehicle (UAV) drone, for example. In some embodiments, an actor 104 may include memory (as may be described below with respect to the example computing device 500 of FIG. 5) that may be used to store software updates for the smart infrastructure devices that comprise a smart infrastructure system 102. A single actor 104 may be capable of storing a full software update itself, but may also only store a portion of a software update. In some cases, the actor 104 may not locally store the software update, but may instead request the software update from an external source, such as the management device 106. In such cases, the actor 104 may merely serve as an intermediary between the smart infrastructure system 102 and the external source where the software update is located.

In some embodiments, management device 106 may be a device such as a remote server that may be used to store information remotely from a smart infrastructure system 102. For example, as described herein, smart infrastructure systems may receive information from various actors 104 that may be formatted for use with different communication protocols. This information may be translated into an agnostic format, which may be stored locally to the smart infrastructure system 102 or may be stored remotely at the management device 106. The management device 106 may also be used to perform any of the methods described herein, such that processing (such as data translations to and from the agnostic format, for example) may take place remotely from the smart infrastructure system 102 as well.

Figure 2:
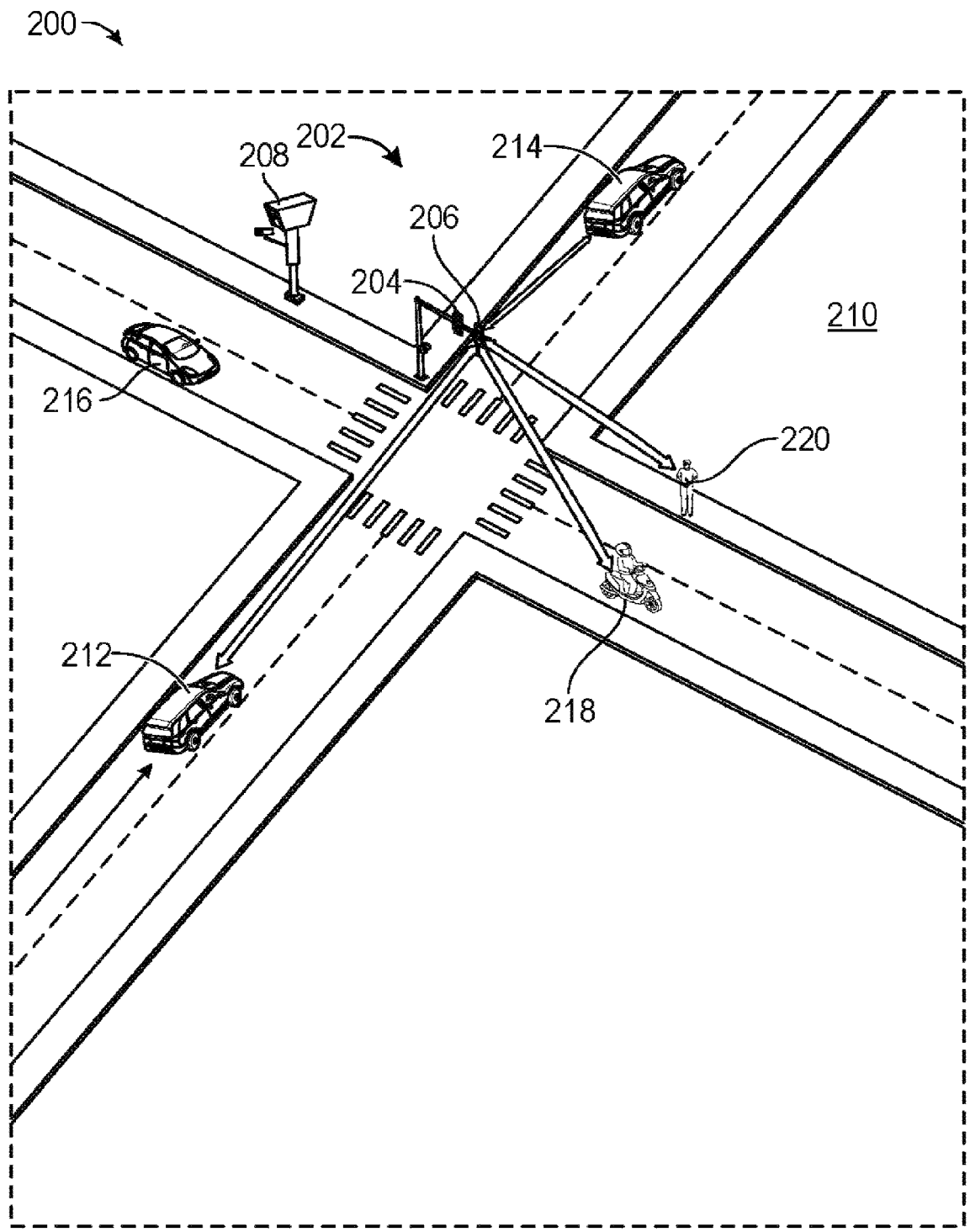
FIG. 2 depicts a schematic illustration of an example system, in accordance with one or more example embodiments of the disclosure.

FIG. 2 illustrates an example system 200, in accordance with one or more embodiments of this disclosure. The system 200 may illustrative a more detailed example of a smart infrastructure system 202 used to employ the multimodal transfer capabilities as described herein (for example, a smart infrastructure system that may serve as an intermediary between actors that may perform communications using different communication protocols). In some embodiments, the smart infrastructure system 202 may include one or more smart infrastructure devices (for example, traffic light 204, traffic light 206, roadside camera 208, and/or any other number and type of smart infrastructure devices). The one or more smart infrastructure devices may exist in an environment 210 with one or more actors (for example, connected vehicle 212, connected vehicle 214, legacy vehicle 216, electric scooter 218, pedestrian mobile device 220, or any number of actors). As described above, some or all of the actors may be capable of communicating with other actors and/or with smart infrastructure system 202 (for example, the connected vehicle 212, connected vehicle 214, electric scooter 218, pedestrian mobile device 220). Such communications may be based on any number of communication protocols that may exist. These communication protocols may include network transmission protocols, such as for example, 3G, Long Term Evolution (LTE), LTE-Advanced, 5G, IEEE 802.11, IEEE 802.16, Bluetooth, Zig-Bee, near-field communication (NFC), and the like. The communication protocols may also include any other number of protocols as well, such as vehicle-to-infrastructure (V2I) communications, vehicle-to-vehicle (V2V) communications, and the like, vehicle-to-everything (V2X) communications and the like. For example, some vehicles may perform V2V communications based on the Society of Automotive Engineers (SAE) J2735 standard and some vehicles may perform V2V communications based on the ITS-G5 communication standard (among various other types of communication standards for various types of communications). The communication protocols may also include any other protocols by which actors may perform communications. Additionally, some or all of the actors may also be incapable of communication with other actors and/or with smart infrastructure (for example, legacy vehicle 216). For example, the legacy vehicle 216 may not include the technology to allow them to communicate with other actors and/or with smart infrastructure in this regard. For example, legacy vehicle 216 may be a vehicle included within the level zero categorization of the Society of Automotive Engineers (SAE) six level autonomous vehicle classification system.

In some embodiments, the system 200 may serve to mitigate or eliminate problems that may arise in an environment 210 that includes numerous different types of actors with varying degrees of communication capabilities and that may use any number of different types of communication protocols through the use of the smart infrastructure system 202 as the intermediary between the various actors in the environment 210. The smart infrastructure system 202 may serve as an intermediary between the various actors in a number of different capacities. As one example, the smart infrastructure system 202 may be configured to receive information from actors in the environment 210 through any number of communication protocols, translate the information into an agnostic format, store the information into the agnostic format, and then translate the information in the agnostic format into a non-agnostic communication protocol to provide to another actor depending on the communication protocol used by that particular actor. As a second example, the smart infrastructure system 202 may not translate the information into the agnostic format, but rather may simply serve as a translation intermediary to translate information between different types of communication protocols to facilitate information sharing between actors that use different types of communication protocols. As a third example, the smart infrastructure system 202 may further be configured to capture information about actors in the environment that are not configured to communicate with other actors and/or with the smart infrastructure, such as the legacy vehicle 216, so that information about these legacy actors may also be provided to the other actors in the environment (for example, the connected vehicle 212, connected vehicle 214, electric scooter 218, pedestrian mobile device 220). This may be beneficial because information about these legacy actors may otherwise not be able to be provided to other actors in the environment 210.

Illustrative Use Case

Figure 3A:
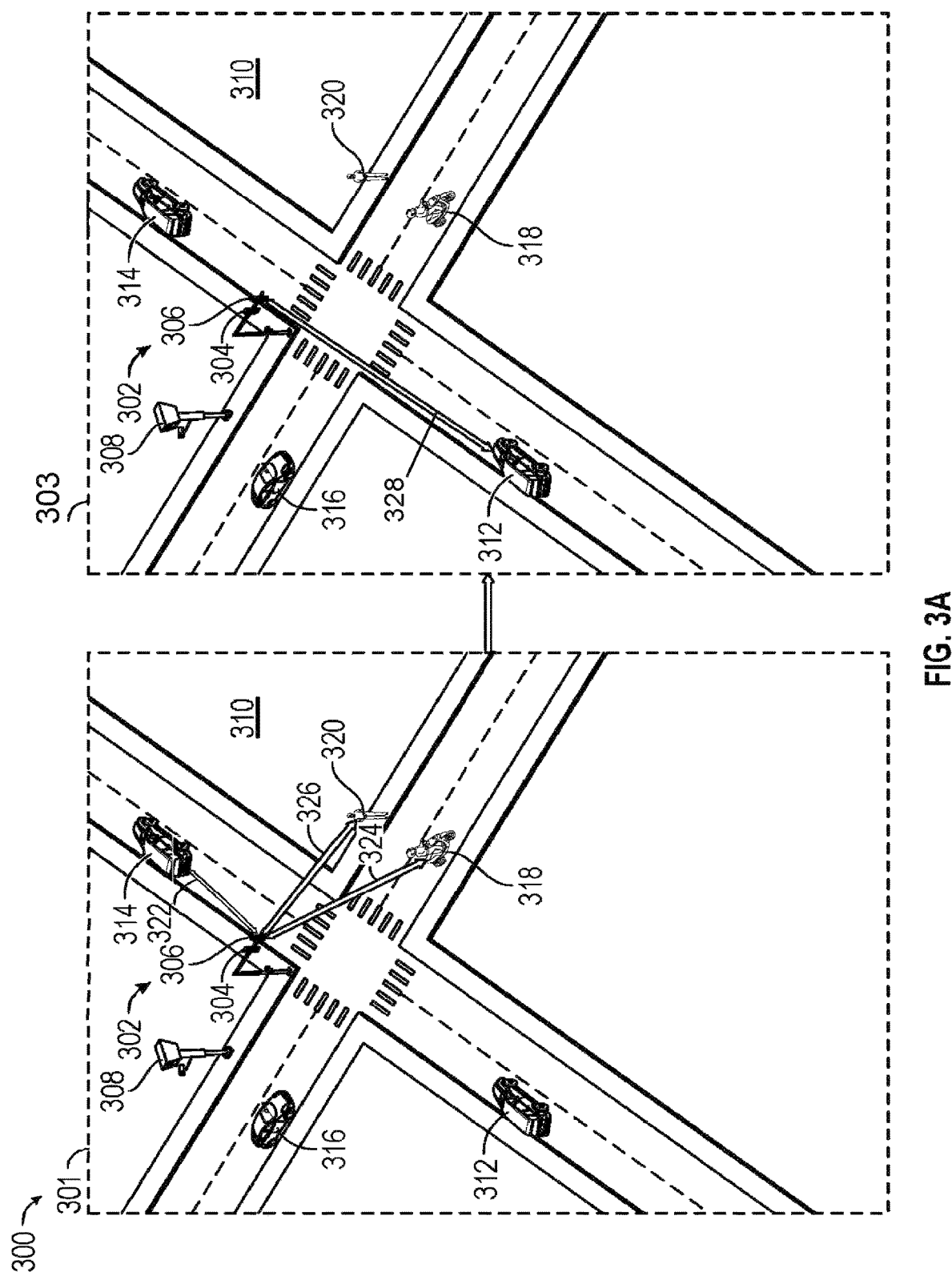
FIGS. 3A-3B depict example use cases, in accordance with one or more example embodiments of the disclosure.

FIG. 3A illustrates an example use case 300, in accordance with one or more example embodiments of the disclosure. The use case 300 may be carried out in association with an example system 300, which may be the same as, or similar to, system 200 depicted in FIG. 2 (as well as any other system described herein). For example, smart infrastructure system 302 may be the same as smart infrastructure system 202, traffic light 304 may be the same as traffic light 204, traffic light 306 may be the same as traffic light 206, roadside camera 308 may be the same as roadside camera 208, connected vehicle 312 may be the same as connected vehicle 212, connected vehicle 314 may be the same as connected vehicle 214, legacy vehicle 316 may be the same as legacy vehicle 216, electric scooter 318 may be the same as electric scooter 218, and/or pedestrian mobile device 320 may be the same as pedestrian mobile device 220. The use case 300 may begin with scene 301 in which various actors in the environment 310 may provide information to a smart infrastructure device of the smart infrastructure system 302. For example, scene 301 may depict connected vehicle 312 sending a communication 322 to traffic light 306, electric scooter 318 sending a communication 324 to traffic light 306, and pedestrian mobile device 320 sending a communication 326 to traffic light 306. It should be noted that although scene 301 depicts communication 322, communication 324, and/or communication 326 being provided to traffic light 306, any communications may similarly be provided to any other number and/or types of smart infrastructure devices in the smart infrastructure system 302 as well (for example, traffic light 304, roadside camera 308, and/or any other types of smart infrastructure devices that may be included in a smart infrastructure system). The communication 322, communication 324, and/or communication 326 may include information about the vehicle 312, electric scooter 318, and pedestrian mobile device 320, such as heading, velocity, and position information, among any other various types of information. The communication 322, communication 324, and/or communication 326 may also be transmitted based on any number of different communication protocols, such as the SAE J2735 standard, for example. The smart infrastructure system 202 may receive these communications and may translate the communications into an agnostic format. For example, the information in communication 322, communication 324, and/or communication 326 may be translated and added to an agnostic format 3D coordinate system as described above. The translation may be performed using a look-up table also as described above, but may also similarly be performed using any other methods for translating information from one protocol to an agnostic format. Following the translation, the example 3D coordinate system may include a representation of the vehicle 312, a representation of the electric scooter 318, and a representation of the pedestrian mobile device 320 (for example, one or more points on the 3D coordinate system, as well as any other types of representations). The representations within the 3D coordinate system may also be associated with the other information provided by the vehicle 312, electric scooter 318, and pedestrian mobile device 320, such as heading, velocity, and position information, among any other various types of information. As mentioned above, it should be noted that the 3D coordinate system representation of the environment 310 may be one non-limiting example of an agnostic format for representing information, and the information may similarly be represented in any other agnostic format as well.

In some embodiments, the agnostic format data may be stored in any number of locations. As one example, the data may be stored locally to any of the smart infrastructure devices (for example, traffic light 304, traffic light 306, and/or roadside camera 308) included within the smart infrastructure system 302. In this example, the agnostic format data may be stored at one particular smart infrastructure device (for example, the traffic light 306), and other smart infrastructure devices (for example, the traffic light 304 and/or the roadside camera 308) may access the data stored at that one particular smart infrastructure device (for example, the traffic light 306). Continuing this example, actors in the environment 310 may request data from the particular smart infrastructure device (for example, the traffic light 306) that is storing the agnostic format data. Actors may also request information from other smart infrastructure devices (for example, the traffic light 304 and/or the roadside camera 308), those devices may request the data from the device (for example, the traffic light 306) that is actually storing the data, the device that is actually storing the data may then provide the data to the smart infrastructure device that received the request, and the data may then be provided to the actors. This scenario may arise, for example, when one particular smart infrastructure device is more proximate to an actor requesting the data than the smart infrastructure device storing the agnostic format data, or if the smart infrastructure device storing the agnostic format data is outside of a communication range of the actor requesting the data. The information may also be provided to actors without a request from the actors for the data. For example, the smart infrastructure may determine that certain types of data may be provided to certain actors, or may also simply provide all information received to all actors in an unfiltered manner. This data may be provided to the actors by the smart infrastructure device storing the data, or the smart infrastructure device storing the data may transmit certain portions (or all) of the data to another smart infrastructure device to provide to the actors. As second example of storage locations for the agnostic format data, the data may be stored at multiple of the smart infrastructure devices. Continuing this example, the data may stored using a distributed ledger such that multiple smart infrastructure devices may simultaneously have access to the same agnostic format data. As a third example of storage locations for the agnostic format data, the data may instead be stored at a remote location from the smart infrastructure devices, such as one or more remote severs, rather than being stored locally to one or more of the smart infrastructure devices. Additionally, the manner in which data from various actors may be consolidated to create the agnostic format data may vary as well. For example, one smart infrastructure device may be designated as the device for receiving data from some or all of the actors, and the actors may initially provide all of the protocol-specific data to this particular smart infrastructure device. However, in other cases, the protocol-specific data may also be provided by actors to any number of different smart infrastructure devices, and then the smart infrastructure devices may coordinate to consulate any data that is received into the agnostic format. For example, the smart infrastructure devices may need to coordinate to ensure that all of the data is captured within the 3D coordinate representation (in the example situation where this is the agnostic format that is used).

In some embodiments, the use case 300 may proceed with scene 303. Scene 303 may depict the information in the agnostic format at the smart infrastructure system 302 being provided to one or more actors in the environment 310. For example, scene 303 may depict information being provided to connected vehicle 312 through a communication 328. The communication 328 may be formatted in a communication protocol that the connected vehicle 312 is capable of recognizing. Thus, use case 300 depicts a scenario in which vehicle 312 is able to obtain information about vehicle 314, electric scooter 318, and pedestrian mobile device 320, even if vehicle 314, electric scooter 318, and pedestrian mobile device 320 use different communication protocols than vehicle 312. However, this is just one non-limiting example of how the smart infrastructure system 302 may be used as an intermediary between the actors in the environment 310. For example, the information in the agnostic format may also be translate into any number of other communication protocols and provided to any number of other actors in the environment 310. For example, the information may be provided back to vehicle 312. The communication protocol into which the agnostic format information is translated may depend on the actor that is receiving the information from the smart infrastructure system 302.

Figure 3B:
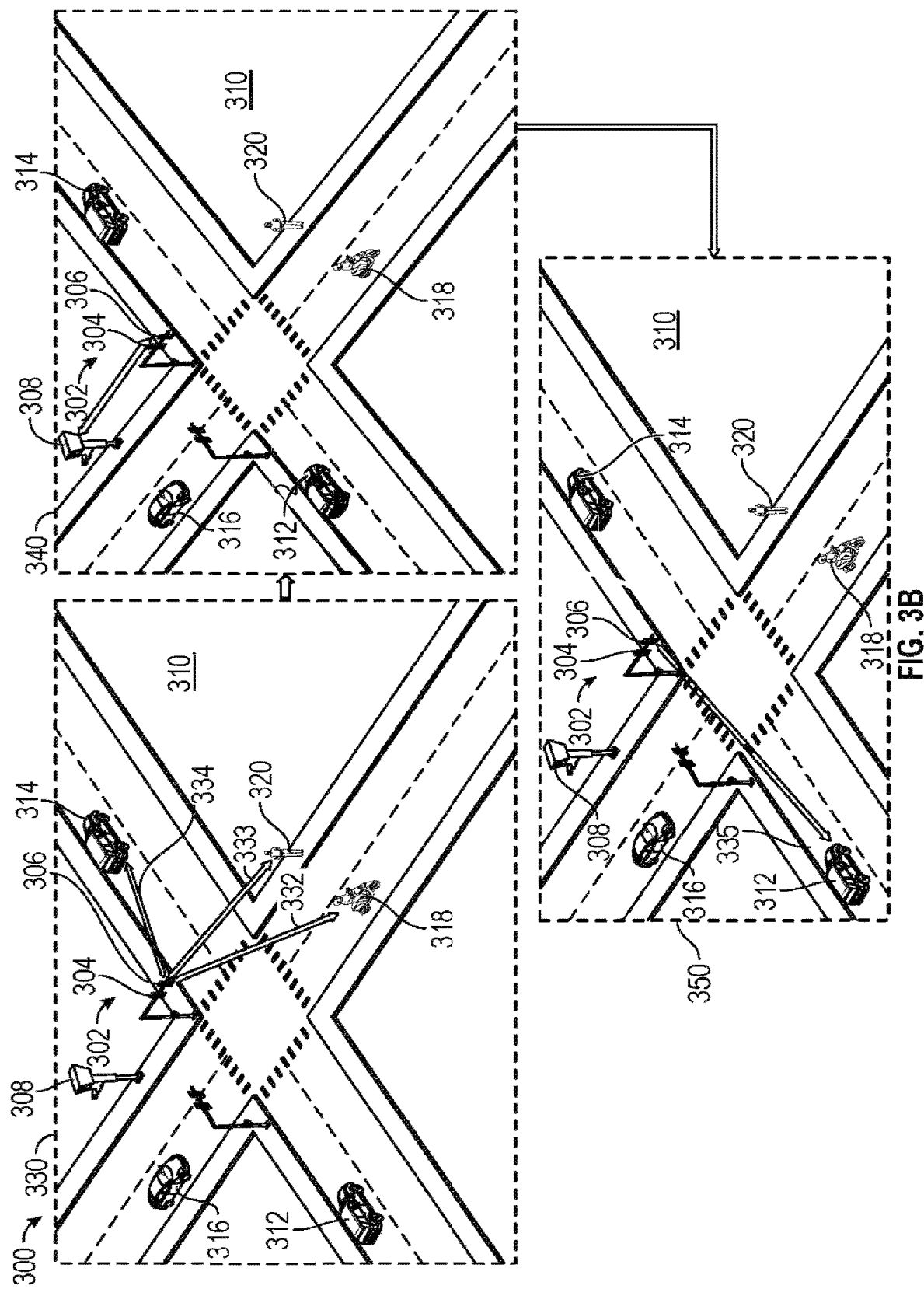

FIG. 3B illustrates a continuation of use case 300 that includes an example of how information regarding an actor that is not capable of communicating with other actors or with the smart infrastructure system may be captured and provided to the other actors in the environment 310. The use case 300 may continue with scene 330, which may depict connected vehicle 314 sending a communication 334 to traffic light 306, electric scooter 318 sending a communication 332 to traffic light 306, and pedestrian mobile device 320 sending a communication 333 to traffic light 306. However, legacy vehicle 316 is depicted as not sending a communication to the smart infrastructure system 302 because the legacy vehicle 316 may not be configured to send such communications. As with communication 322, communication 324, and communication 326 depicted in scene 301 of FIG. 3A, communication 332, communication 333, and communication 334 may be formatting according to one or more different communication protocols, such as the SAE J2735 standard, for example. Additionally, during this time, any of the smart infrastructure devices may be capturing one or more images, videos, and/or real-time feeds of the environment 310 as well. For exemplification purposes, the roadside camera 308 in the smart infrastructure system 302 may be capturing these one or more images, videos, and/or real-time feeds of the environment 310. These one or more images, videos, and/or real-time feeds may be captured periodically or continuously in real-time.

In some embodiments, the use case 300 may proceed to scene 340. Scene 340 may depict the smart infrastructure system 302 determining that the legacy vehicle 316 is a legacy actor and capturing information about the legacy vehicle 316 to add to the agnostic format information stored at the smart infrastructure system 302. This determination, for example, may be made by comparing information received by various actors that are capable of communicating with other actors and/or smart infrastructure system to the actors present in the one or more images, videos, and/or real-time feeds captured by the smart infrastructure system 302. For example, the smart infrastructure system 302 may know, based on information in communication 334 and communication 332 that the vehicle 314 is at a first location at a first time and the electric scooter 318 is at a second location at the first time. The smart infrastructure system 302 may then determine that the one or more images, videos, and/or real-time feeds show a vehicle in the first location at the first time and an electric scooter at the second location at the first time, so the smart infrastructure system may be able to determine that these are the vehicle 314 and the electric scooter 318. However, the smart infrastructure system may also identify the existence of the legacy vehicle 316 in the one or more images, videos, and/or real-time feeds. The smart infrastructure system 302 may determine that no information has been received from an actor at the position of the legacy vehicle 316, and based on this, may determine that the legacy vehicle 316 is incapable of communicating with the smart infrastructure system 302. The smart infrastructure system 302 may then proceed to capture information about the legacy vehicle 316 using one or more images, videos, and/or real-time feeds. That is, the smart infrastructure system 302 may utilize previously captured images, videos, and/or real-time feeds to extract information regarding the legacy vehicle 316, or may capture new one or more images, videos, and/or real-time feeds. In order to extract the information from the one or more images, videos, and/or real-time feeds, the smart infrastructure system 302 may employ computer vision methods to determine the heading, velocity, and location of the legacy vehicle 316. The smart infrastructure system 302 may similarly extract the information using any other type of method as well. Additionally, the smart infrastructure system 302 may also determine any other types of information about the legacy vehicle 316 as well.

Continuing scene 340, in some instances, the smart infrastructure system 302 may identify some actors in the one or more images, videos, and/or real-time feeds that have not provided information to the smart infrastructure system, but are actually capable of doing so. For example, the vehicle 312 may not yet have provided any information to the smart infrastructure system 302. In such instances, in order to verify whether the vehicle 312 is capable of communicating with the smart infrastructure system 302, the smart infrastructure system 302 may transmit a request to the vehicle 312. If the smart infrastructure system 302 receives an acknowledgement or any other form of a response from the vehicle 312, then it may be determined that the vehicle 312 is not a legacy vehicle. However, if no response is received from the vehicle 312 after a threshold period of time (or a threshold number of requests are sent), then the smart infrastructure system 302 may be able to confirm that the vehicle 312 is a legacy vehicle. This may serve as a secondary verification to ensure that the smart infrastructure system 302 reduces inefficiencies by only capturing information through the one or more images, videos, and/or real-time feeds for vehicles that are incapable of providing information to the smart infrastructure system 302.

In some embodiments, once the information about the legacy vehicle 316 is captured by the smart infrastructure system 302 and added to the data in the agnostic format, the use case 300 may proceed to scene 350. Scene 350 may depict, similar to scene 303 in FIG. 3A, information being provided to connected vehicle 312 through a communication 335. The communication 335 may be formatted in a communication protocol that the connected vehicle 312 is capable of recognizing. The information may similarly be provided to any of the other actors in the environment 310 as well.

Illustrative Methods

Figure 4:
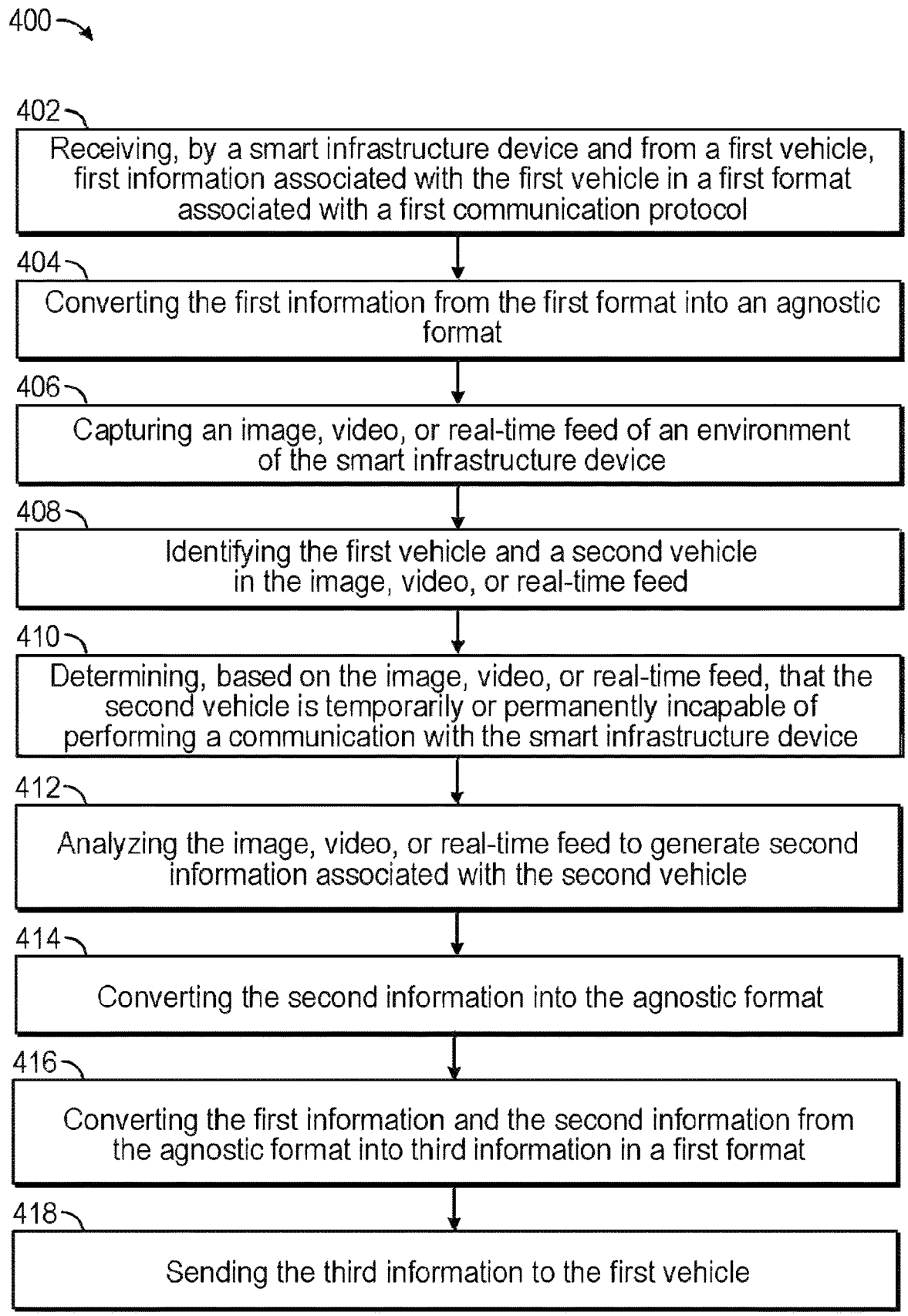
FIG. 4 depicts an example method, in accordance with one or more example embodiments of the disclosure.

FIG. 4 is an example method 400. At block 402 of the method 400 in FIG. 4, the method may include receiving, by a smart infrastructure device and from a first vehicle, first information associated with the first vehicle in a first format associated with a first communication protocol. Block 404 of the method 400 may include converting the first information from the first format into an agnostic format. In some embodiments, this translation or conversion of the information in the protocol-specific format into the agnostic format (as well as the translation or conversion from the agnostic format to a protocol-specific format as may be described below) may be performed using one or more lookup tables. In some embodiments, the translation or conversion may also be performed using any other suitable method, such as any geometric transformation to add data to an agnostic 3D coordinate system as described below. The lookup tables may include a listing of different types of standards that may be used by different actors to communicate information. Upon receipt of information from an actor, a smart infrastructure device may be able to reference a lookup table including information about the format used, which may allow the smart infrastructure device to extract information from the communication from the actor to include in the agnostic format. In some instances, the one or more lookup tables may be stored at the smart infrastructure devices themselves, or may be stored at one or more remote locations, such as one or more remote servers. The one or more lookup tables may also be stored in any other manner (for example, in any similar manner as the agnostic format data may be described below as being stored as well).

In some embodiments, the agnostic format data maintained at the smart infrastructure may refer to a representation of data and/or a protocol for communicating data that is independent of any specific protocol used by any of the various actors. As one non-limiting example, the agnostic format may be in the form of a 3D coordinate system representation of the environment based on information received from the actors in the environment. Continuing this example, the smart infrastructure may receive information about a heading, velocity, and current location of a first vehicle in a first format associated with a given communication protocol (as well as any other types of information about the first vehicle). The smart infrastructure may also receive information from any other number of actors in the environment as well. The smart infrastructure may convert this information in the first format associated with the communication protocol into the agnostic format and store the information. More particularly, the smart infrastructure may add a representation of the first vehicle in the 3D coordinate system, where the location of the representation within the 3D coordinate system may be based on the information provided by the vehicle. In some instances, the representation may be in the form of one or more points on the 3D coordinate system. In such instances, the one or more points may be associated with any of the information about the first vehicle, such as its speed, for example. The smart infrastructure system may also receive information about a pedestrian based on information received from a mobile device of the pedestrian. The smart infrastructure system may similarly convert this information into the agnostic format and store the information. More particularly, the smart infrastructure may add a representation of the pedestrian in the 3D coordinate system, where the location of the representation in the 3D coordinate system may be based on the information provided by the mobile device of the pedestrian. Thus, the agnostic 3D coordinate system stored at the smart infrastructure may now include information about the first vehicle and the pedestrian. Additionally, the information described above as being provided by the first vehicle and the pedestrian may simply be for exemplification purposes, and any other types of information may similarly be provided. Furthermore, although the data in the agnostic format is described above as being stored at the smart infrastructure, the data in the agnostic format may similarly be stored remotely from the smart infrastructure, and the smart infrastructure may access the remotely-stored data to provide to actors, as may be described below.

Block 406 of the method 400 may include capturing an image, video, or real-time feed of an environment of the smart infrastructure device. Block 408 of the method 400 may include identifying the first vehicle and a second vehicle in the image, video, or real-time feed. Block 410 of the method 400 may include determining, based on the image, video, or real-time feed, that the second vehicle is temporarily or permanently incapable of performing a communication with the smart infrastructure device. Block 412 of the method 400 may include analyzing the image, video, or real-time feed to generate second information associated with the second vehicle. Block 414 of the method 400 may include converting the second information into the agnostic format. Block 416 may include converting the first information and the second information from the agnostic format into third information in a first format. Block 418 may include sending the third information to the first vehicle. In some embodiments, before capturing information about a particular actor, the smart infrastructure may determine whether the particular actor is temporarily or permanently incapable of communicating with the smart infrastructure (or other actors). For example, such an actor may be a legacy actor that is permanently incapable of communicating with smart infrastructure (or other actors). This may be the result of the legacy actor not including the necessary technology to perform such communications. As another example, an actor may be capable of performing such communications, may be temporarily unable to do so for any number of reasons (for example, a communication device of the actor is malfunctioning). This determination, for example, may be made by comparing information received by various actors that are capable of communicating with other actors and/or smart infrastructure to the actors present in the one or more images, videos, and/or real-time feeds captured by the smart infrastructure. For example, the smart infrastructure may receive information from a first vehicle and a second vehicle that are both capable of communicating with the smart infrastructure. The information received from the first vehicle and the second vehicle may indicate that the first vehicle is at a first location at a first time and the second vehicle is at a second location at the first time. The smart infrastructure system may determine that the one or more images, videos, and/or real-time feeds captured by the smart infrastructure include a vehicle in the first location at the first time and a vehicle at the second location at the first time, so the smart infrastructure may be able to determine that these are the first vehicle and the second vehicle. However, the smart infrastructure may also identify a third vehicle in the one or more images, videos, and/or real-time feeds. If the smart infrastructure is not able to associate any information received from any actors in the environment with the third vehicle in the one or more images, videos, and/or real-time feeds of the, then the smart infrastructure may determine that the third vehicle is incapable of communicating with the smart infrastructure. In such cases, the smart infrastructure may then ascertain information about the third vehicle to store in the agnostic format or to provide to the other actors through the one or more images, videos, and/or real-time feeds of the as described above. In some instances, the third vehicle may actually be capable of communicating with the smart infrastructure, but simply may not have provided any information to the smart infrastructure yet. In such instances, in order to verify whether the third vehicle is capable of communicating with the smart infrastructure, the smart infrastructure may transmit a request to the third vehicle. If the smart infrastructure received an acknowledgement or any other form of a response from the third vehicle, then it may be determined that the third vehicle is not a legacy vehicle. However, if no response is received from the third vehicle after a threshold period of time (or a threshold number of requests are sent), then the smart infrastructure may be able to confirm that the third vehicle is a legacy vehicle. This may serve as a secondary verification to ensure that the smart infrastructure reduces inefficiencies by only capturing information through the one or more images, videos, and/or real-time feeds for vehicles that are incapable of providing information to the smart infrastructure.

The operations described and depicted in the illustrative process flow of FIG. 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

Illustrative Computing Device

Figure 5:
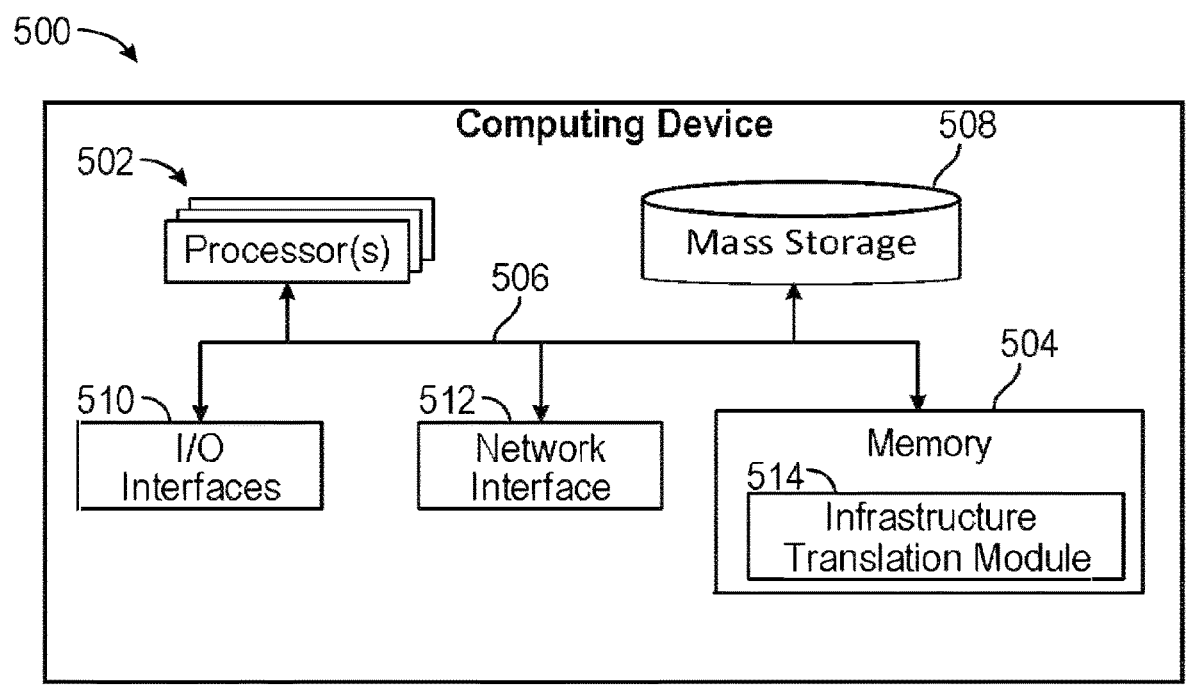
FIG. 5 depicts a schematic illustration of an example computing device architecture, in accordance with one or more example embodiments of the disclosure.

FIG. 5 illustrates an example computing device 500, in accordance with one or more embodiments of this disclosure. The computing device 500 may be representative of any number of elements described herein, such as any of the smart infrastructure systems 102, the actors 104, the management device 106, or any other element described herein. The computing device 500 may include at least one processor 502 that executes instructions that are stored in one or more memory devices (referred to as memory 504). The instructions can be, for instance, instructions for implementing functionality described as being carried out by one or more modules and systems disclosed above or instructions for implementing one or more of the methods disclosed above. The processor(s) 502 can be embodied in, for example, a CPU, multiple CPUs, a GPU, multiple GPUs, a TPU, multiple TPUs, a multi-core processor, a combination thereof, and the like. In some embodiments, the processor(s) 502 can be arranged in a single processing device. In other embodiments, the processor(s) 502 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 502 can access the memory 504 by means of a communication architecture 506 (e.g., a system bus). The communication architecture 506 may be suitable for the particular arrangement (localized or distributed) and type of the processor(s) 502. In some embodiments, the communication architecture 506 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 504 also can retain data, such as any ledger information, among other data.

Each computing device 500 also can include mass storage 508 that is accessible by the processor(s) 502 by means of the communication architecture 506. The mass storage 508 can include machine-accessible instructions (e.g., computer-readable instructions and/or computer-executable instructions). In some embodiments, the machine-accessible instructions may be encoded in the mass storage 508 and can be arranged in components that can be built (e.g., linked and compiled) and retained in computer-executable form in the mass storage 508 or in one or more other machine-accessible non-transitory storage media included in the computing device 500. Such components can embody, or can constitute, one or many of the various modules disclosed herein. Such modules are illustrated as smart infrastructure translation modules 514. In some instances, the modules may also be included within the memory 504 as well.

Execution of the smart infrastructure translation modules 514, individually or in combination, by at least one of the processor(s) 502, can cause the computing device 500 to perform any of the operations described herein (for example, the operations described with respect to FIG. 4, as well as any other operations).

Each computing device 500 also can include one or more input/output interface devices 510 (referred to as I/O interface 510) that can permit or otherwise facilitate external devices to communicate with the computing device 500. For instance, the I/O interface 510 may be used to receive and send data and/or instructions from and to an external computing device.

The computing device 500 also includes one or more network interface devices 512 (referred to as network interface(s) 512) that can permit or otherwise facilitate functionally coupling the computing device 500 with one or more external devices. Functionally coupling the computing device 500 to an external device can include establishing a wireline connection or a wireless connection between the computing device 500 and the external device. The network interface devices 512 can include one or many antennas and a communication processing device that can permit wireless communication between the computing device 500 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface (s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

The invention claimed is:
1. A method comprising:
  receiving, by a smart infrastructure device of a smart infrastructure system and from a first vehicle, first information associated with the first vehicle in a first format associated with a first communication protocol;
  by a camera of the smart infrastructure system, capturing an image, video, or real-time feed of an environment of the smart infrastructure device;
  by a processor of the smart infrastructure system:
    identifying a second vehicle in the image, video, or real-time feed;
    determining that the smart infrastructure device has not received communication from the second vehicle;

responsive to determining that the smart infrastructure device has not received communication from the second vehicle, transmitting a communication request to the second vehicle;
determining that the second vehicle is incapable of performing communication with the smart infrastructure device in response to not receiving a response to the communication request from the second vehicle within a threshold period of time;
responsive to determining that the second vehicle is incapable of performing communication with the smart infrastructure device, generating second information associated with the second vehicle, wherein the second information comprises a representation of the second vehicle in a 3D coordinate system;
converting the second information from the representation in the 3D coordinate system into the first format; and
sending the second information in the first format associated with the first communication protocol to the first vehicle.

2. The method of claim 1, further comprising, before sending the second information to the first vehicle, converting the first information into a format of the 3D coordinate system and adding the first information to the 3D coordinate system.

3. The method of claim 1, wherein converting the second information from the representation in the 3D coordinate system into the first format comprises using the 3D coordinate system including a first coordinate representative of the first vehicle that is created based on the first information and a second coordinate representative of the second vehicle that is created based on the second information.

4. The method of claim 1, wherein converting the second information from the representation in the 3D coordinate system into the first format comprises converting the second information from a second format into an agnostic format, and then converting the second information from the agnostic format into the first format.

5. The method of claim 1, wherein determining that the smart infrastructure device has not received communication from the second vehicle comprises:
identifying a location of the first vehicle;
comparing the location of the first vehicle to a location of a vehicle in the image, video, or real-time feed;
determining that the location of the first vehicle is a same location as the location of the vehicle in the image, video, or real-time feed;
analyzing the image, video, or real-time feed to identify a location of the second vehicle; and
determining that the location of the first vehicle is not the same as the location of the second vehicle in the image, video, or real-time feed.

6. The method of claim 1, further comprising:
converting at least one of the first information or the second information into third information in a third format associated with a third communication protocol; and
sending the third information in the third format to a third vehicle.

7. The method of claim 1, further comprising:
receiving, by the smart infrastructure device and from a non-vehicle device, information associated with the non-vehicle device in a different format associated with a communication protocol other than the first communication protocol;
converting the information associated with the non-vehicle device into the first format; and
sending the information associated with the non-vehicle device in the first format associated with the first communication protocol to the first vehicle.

8. A smart infrastructure system comprising:
a processor;
a camera; and
a memory storing computer-executable instructions, that when executed by the processor, will cause the processor to:
receive, by a smart infrastructure device of the smart infrastructure system and from a first vehicle, first information associated with the first vehicle in a first format associated with a first communication protocol;
receive, from the camera, a captured image, video, or real-time feed of an environment of the smart infrastructure device;
identify a second vehicle in the image, video, or real-time feed;
determine that the smart infrastructure device has not received communication from the second vehicle;
responsive to determining that the smart infrastructure device has not received communication from the second vehicle, transmit a communication request to the second vehicle;
determine that the second vehicle is incapable of performing communication with the smart infrastructure device in response to not receiving a response to the communication request from the second vehicle within a threshold period of time;
responsive to determining that the second vehicle is incapable of performing communication with the smart infrastructure device, analyze the image, video, or real-time feed to generate second information associated with the second vehicle, wherein the second information comprises a representation of the second vehicle in a 3D coordinate system;
converting the second information from the representation in the 3D coordinate system into the first format; and
sending the second information in the first format associated with the first communication protocol to the first vehicle.

9. The system of claim 8, wherein the computer-executable instructions will, when executed by the processor, further cause the processor to, before sending the second information to the first vehicle, convert the first information into a format of the 3D coordinate system and adding the first information to the 3D coordinate system.

10. The system of claim 8, wherein the instructions to convert the second information from the representation in the 3D coordinate system into the first format include instructions to use the 3D coordinate system including a first coordinate representative of the first vehicle that is created based on the first information and a second coordinate representative of the second vehicle that is created based on the second information.

11. The system of claim 8, wherein the instructions to convert the second information from the representation in the 3D coordinate system into the first format comprise instructions to convert the second information from a second format into an agnostic format, and then converting the second information from the agnostic format into the first format.

12. The system of claim 8, wherein the instructions to determine that the smart infrastructure device has not received communication from the second vehicle comprise instructions to do so in response to:
   identifying a location of the first vehicle;
   comparing the location of the first vehicle to a location of a vehicle in the image, video, or real-time feed;
   determining that the location of the first vehicle is a same location as the location of the vehicle in the image, video, or real-time feed;
   analyzing the image, video, or real-time feed to identify a location of the second vehicle; and
   determining that the location of the first vehicle is not the same as the location of the second vehicle in the image, video, or real-time feed.

13. The system of claim 8, wherein the computer-executable instructions further cause the processor to:
   convert at least one of the first information or the second information into third information in a third format associated with a third communication protocol; and
   send the third information in the third format to a third vehicle.

14. The system of claim 8, wherein the computer-executable instructions further cause the processor to:
   receive, by the smart infrastructure device and from a non-vehicle device, fourth information associated with the non-vehicle device in a different format associated with a communication protocol other than the first communication protocol;
   convert the information associated with the non-vehicle device into the first format; and
   send the information associated with the non-vehicle device in the first format associated with the first communication protocol to the first vehicle.

15. A non-transitory computer readable medium including computer-executable instructions stored thereon, which when executed by one or more processors, will cause the one or more processors to perform operations comprising:
   receiving, by a smart infrastructure device and from a first vehicle, first information associated with the first vehicle in a first format associated with a first communication protocol;
   capturing an image, video, or real-time feed of an environment of the smart infrastructure device;
   identifying a second vehicle in the image, video, or real-time feed;
   determining that communication has not been received from the second vehicle;
   responsive to determining that communication has not been received from the second vehicle, transmitting a communication request to the second vehicle;
   determining that the second vehicle is incapable of performing communication with the smart infrastructure device in response to not receiving a response to the communication request from the second vehicle within a threshold period of time;
   responsive to determining that the second vehicle is incapable of performing communication with the smart infrastructure device, generating second information associated with the second vehicle, wherein the second information comprises a representation of the second vehicle in a 3D coordinate system;
   converting the second information from the representation in the 3D coordinate system into the first format; and
   sending the second information in the first format associated with the first communication protocol to the first vehicle.

16. The non-transitory computer readable medium of claim 15, wherein the computer-executable instructions will, when executed by the one or more processors, further cause the one or more processors to, before sending the second information to the first vehicle, convert the first information into a format of the 3D coordinate system and adding the first information to the 3D coordinate system.

17. The non-transitory computer readable medium of claim 15, wherein the instructions to convert the second information from the representation in the 3D coordinate system into the first format include instructions to use the 3D coordinate system including a first coordinate representative of the first vehicle that is created based on the first information and a second coordinate representative of the second vehicle that is created based on the second information.

18. The non-transitory computer readable medium of claim 15, wherein the instructions to determine that communication has not been received from the second vehicle comprise instructions to do so in response to:
   identifying a location of the first vehicle;
   comparing the location of the first vehicle to a location of a vehicle in the image, video, or real-time feed;
   determining that the location of the first vehicle is a same location as the location of the vehicle in the image, video, or real-time feed;
   analyzing the image, video, or real-time feed to identify a location of the second vehicle; and
   determining that the location of the first vehicle is not the same as the location of the second vehicle in the image, video, or real-time feed.

19. The non-transitory computer readable medium of claim 15, wherein the computer-executable instructions further cause the one or more processors to perform operations comprising:
   converting at least one of the first information or the second information into third information in a third format associated with a third communication protocol; and
   sending the third information in the third format to a third vehicle.

20. The non-transitory computer readable medium of claim 15, wherein the computer-executable instructions further cause the one or more processors to perform operations comprising:
   receiving, by the smart infrastructure device and from a non-vehicle device, fourth information associated with the non-vehicle device in a different format associated with a communication protocol other than the first communication protocol;
   converting the information associated with the non-vehicle device into the first format; and
   sending the information associated with the non-vehicle device in the first format associated with the first communication protocol to the first vehicle.

* * * * *